(12) United States Patent
Drehobl et al.

(10) Patent No.: US 12,163,492 B2
(45) Date of Patent: Dec. 10, 2024

(54) CONDITIONING OF A PRE-CHAMBER GAS FLOW FOR A COMBUSTION ENGINE

(71) Applicant: Caterpillar Energy Solutions GmbH, Mannheim (DE)

(72) Inventors: Enrico Drehobl, Reilingen (DE); Friedrich Schaefer, Edenkoben (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/287,700

(22) PCT Filed: Apr. 12, 2022

(86) PCT No.: PCT/EP2022/025145
§ 371 (c)(1),
(2) Date: Oct. 20, 2023

(87) PCT Pub. No.: WO2022/223145
PCT Pub. Date: Oct. 27, 2022

(65) Prior Publication Data
US 2024/0183326 A1    Jun. 6, 2024

(30) Foreign Application Priority Data
Apr. 20, 2021  (GB) ...................... 2105649

(51) Int. Cl.
*F02M 21/02* (2006.01)
*F02B 19/00* (2006.01)

(52) U.S. Cl.
CPC ......... *F02M 21/0275* (2013.01); *F02B 19/00* (2013.01)

(58) Field of Classification Search
CPC ............................ F02M 21/0275; F02B 19/00
(Continued)

(56) References Cited

U.S. PATENT DOCUMENTS

| | | | | |
|---|---|---|---|---|
| 1,384,686 A | * | 7/1921 | Christmas | F02B 19/14 123/252 |
| 2,896,658 A | * | 7/1959 | Jones | F02M 21/06 137/340 |

(Continued)

FOREIGN PATENT DOCUMENTS

| | | |
|---|---|---|
| CN | 206496863 U | 9/2017 |
| CN | 105715413 B | 4/2018 |

(Continued)

OTHER PUBLICATIONS

Great Britain Search Report related to Application No. GB2105649. 4; reported on Sep. 15, 2021.

(Continued)

*Primary Examiner* — Sizo B Vilakazi

(57) ABSTRACT

The present invention pertains to arrangements for a pre-chamber of a combustion engine as well as pre-chambers comprising such arrangements, in particular to condition or temper a gas flow within a gas-purged pre-chamber prior to entering a combustion area. Accordingly, an arrangement for a pre-chamber gas valve of a combustion engine is suggested, comprising a housing having an outer surface and comprising a channel, a first end of the channel being in fluid communication with the outer surface and a second end of the channel being connectable to a valve seat of the pre-chamber gas valve, and at least one protrusion extending from the outer surface of the housing. The first end of the channel is arranged upstream of the second end of the channel and downstream of at least one protrusion, wherein the arrangement is configured to absorb heat from a combustion portion of the combustion engine arranged downstream of the second end and to temper a gas upstream of the second end only using said heat, when the arrangement is in a mounted state.

20 Claims, 2 Drawing Sheets

(58) Field of Classification Search
USPC .......................................................... 123/253
See application file for complete search history.

(56) References Cited

U.S. PATENT DOCUMENTS

| | | | | |
|---|---|---|---|---|
| 4,620,516 | A * | 11/1986 | Reum | F02M 53/06 |
| | | | | 123/297 |
| 7,024,852 | B2 * | 4/2006 | Trapp | F01N 3/22 |
| | | | | 60/307 |
| 2016/0245151 | A1 * | 8/2016 | Yuuki | F02B 19/08 |
| 2016/0252005 | A1 * | 9/2016 | Jacob | F02M 21/0269 |
| | | | | 137/537 |
| 2016/0252006 | A1 * | 9/2016 | Jacob | F02M 21/0242 |
| | | | | 123/266 |
| 2016/0252007 | A1 * | 9/2016 | Ge | F02B 19/108 |
| | | | | 123/254 |

FOREIGN PATENT DOCUMENTS

| | | | |
|---|---|---|---|
| EP | 3061962 | A1 | 8/2016 |
| FR | 842032 | A | 6/1939 |
| GB | 863485 | A | 3/1961 |
| RU | 2101543 | C1 | 1/1998 |

OTHER PUBLICATIONS

International Search Report related to Application No. PCT/EP2022/025145; reported on Aug. 4, 2022.

* cited by examiner

CONDITIONING OF A PRE-CHAMBER GAS FLOW FOR A COMBUSTION ENGINE

CROSS-REFERENCE TO RELATED APPLICATION

This application is a USC §371 US National Stage filing International Application No. PCT/EP2022/025145 filed on Apr. 12, 2022 which claims priority under the Paris Convention to Great Britain Patent Application 2105649.4 filed on Apr. 20, 2021.

TECHNICAL FIELD

The present invention pertains to arrangements for a pre-chamber of a combustion engine as well as pre-chambers comprising such arrangements, in particular to condition or temper a gas flow within a gas-purged pre-chamber prior to entering a combustion area.

TECHNOLOGICAL BACKGROUND

In common pre-chambers of combustion engines, one or more valves are provided to ensure that the required gas mass flow is established or maintained. The gas mass supplied per work cycle depends on several factors such as the free cross-section of the valve flow, the valve opening time, the gas pressure, and the gas temperature. Due to fluctuations of external factors such as the outside temperature and/or adaptations of the conduits conducting the gas, variations in gas mass flows may occur even when the remaining boundary conditions are essentially constant. This may accordingly cause fluctuations in the performance of the combustion engine.

Accordingly, there is a need to improve current control of gas mass flows provided via a pre-chamber to a combustion area of a combustion engine and to at least partially abrogate the above unfavorable conditions.

SUMMARY OF THE INVENTION

Starting from the prior art, it is an objective to provide a new and inventive arrangement for a pre-chamber gas valve. In particular, it may be an objective to provide an arrangement which facilitates tempering or conditioning a gas mass flow within and/or throughout the pre-chamber gas valve.

This objective is solved by means of an arrangement for a pre-chamber gas valve of a combustion engine with the features of claim 1. Preferred embodiments are set forth in the present specification, the Figures as well as the dependent claims.

Accordingly, an arrangement for a pre-chamber gas valve of a combustion engine, preferably a gas engine, is suggested, which comprises a housing having an outer surface and comprising a channel, wherein a first end of the channel is in fluid communication with the outer surface and a second end of the channel is connectable to a valve seat of the pre-chamber gas valve. The arrangement furthermore comprises at least one protrusion extending from the outer surface of the housing. The first end of the channel is arranged upstream of the second end of the channel and downstream of at least one protrusion, wherein the arrangement is configured to absorb heat from a combustion portion of the combustion engine arranged downstream of the second end and to temper a gas upstream of the second end only using said heat, when the arrangement is in a mounted state.

Furthermore, a pre-chamber for a combustion engine is suggested, comprising the arrangement according to the invention and a body having a wall defining an inner surface and accommodating the arrangement within said wall, wherein the wall comprises a gas inlet and a gas outlet, and wherein the gas inlet is arranged upstream of the at least one protrusion and the gas outlet is fluidly connectable to the second end of the channel via a pre-chamber gas valve.

Furthermore, a combustion engine, preferably a gas engine, comprising a pre-chamber according to the invention is suggested.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
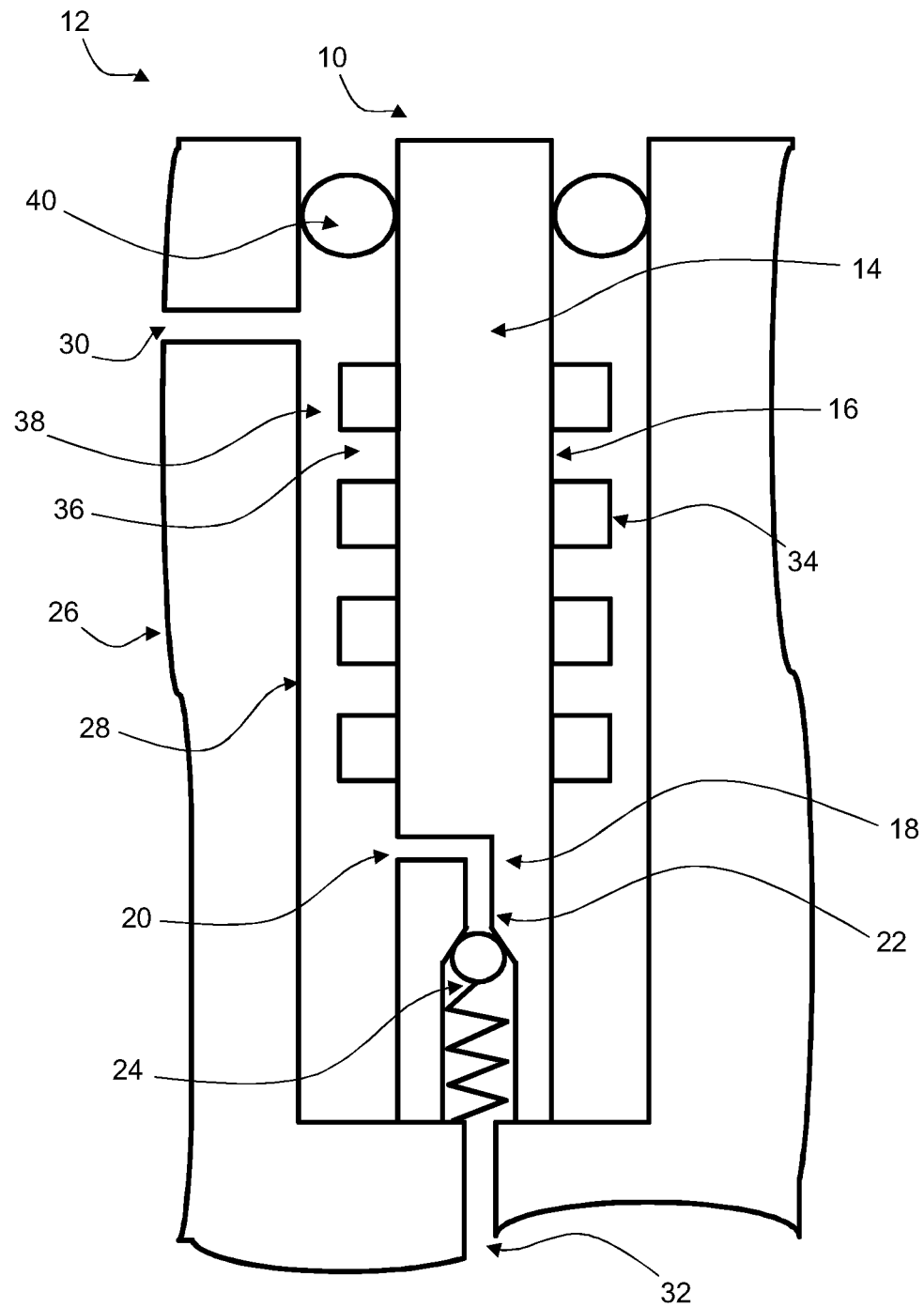
FIG. 1 shows a schematic depiction of an arrangement mounted in a pre-chamber in a longitudinal section.

In the following, the invention will be explained in more detail with reference to the accompanying figures. In the Figures, like elements are denoted by identical reference numerals and repeated description thereof may be omitted in order to avoid redundancies.

In FIG. 1 a schematic depiction of an arrangement 10 is shown along a longitudinal section. The arrangement 10 is mounted in a pre-chamber 12 of a combustion engine, e.g. a gas engine, wherein the pre-chamber 12 is shown only in part. The arrangement 10 comprises a housing 14 and a plurality of protrusions 34, which are arranged along an outer surface 16 of the housing 14 and extend radially, i.e. in a direction perpendicular to the longitudinal direction defined by the housing 14 and the arrangement 10 as a whole. The housing 14 and the protrusions 34 are formed of a solid and filled material, such as a metal or a ceramic material, so as to provide improved thermal conductivity and heat dissipation in the mounted state and during operation of the combustion engine.

The protrusions 34 furthermore extend along the longitudinal or axial direction of the housing 14, i.e. at the outer surface 16 thereof, and are spaced apart in said direction so as to provide respective cavities 36 between adjacent protrusions 34 and between the respective protrusion 34 and the outer surface 16 of the housing 14.

According to the present embodiment, the protrusions 34 are arranged upstream, i.e. above, of a channel 18. However, it may be provided that one or more protrusions 34 are arranged adjacent to or below the channel 18 at the outer surface 14, thereby optionally providing a further deflection or biasing towards the channel 18. The channel 18 comprises a first end 20 and a second end 22, wherein the first end 20 is in fluid communication with the outer surface 16 and the second end 22 of the channel 18 is connected to a valve 24, e.g. via a valve seat of the valve 24. The first end 20 of the channel 18 is arranged upstream of the second end 22 of the channel 18 and, according to the present embodiment, downstream of the protrusions 34.

The channel 18 hence provides that a combustible fluid passing along the outer surface 16 of the housing 14 is directed towards the valve 24 to provide a predefined volume and mass flow towards a downstream combustion area of the combustion engine. The protrusions 34 are dimensioned such that a cross-section of a respective cavity 36 in an axial and radial direction of the housing 14 is larger than a cross-section of the channel 18. Thereby, potential undesirable pressure build-ups and/or flow restrictions may be essentially avoided.

At the same time the protrusions 34 provide deflections of the combustible fluid, such that turbulences occur, thereby not only increasing the residing time within the pre-chamber 12, but also facilitating heat transfer between the protrusions 34, outer surface 16, and the combustible fluid. Accordingly, the protrusions 34 provide that a tempering or temperature conditioning of the combustible fluid is achieved, such that, depending e.g. on the nominal operating parameters of the combustion engine and the configuration of the arrangement, e.g. the dimensioning and material choice of the housing 14 and the protrusions 34, a predefined temperature or temperature range may be provided for the combustible fluid. Thereby, the mass flow may be provided in an essentially consistent manner, such that engine performance may be improved and operating stability is increased.

In other words, the arrangement 10 is configured to absorb heat from a combustion portion of the combustion engine arranged downstream of the second end 22 and to temper a gas upstream of the second end 22 only using said heat, when the arrangement 10 is in a mounted state. The configuration of the arrangement 10 may hence be adapted to the amount of heat produced in the combustion portion or area and the required heat transfer or profile to achieve a predefined tempering of the combustible fluid.

The combustible fluid is provided via the pre-chamber 12, which comprises a body 26 having a gas inlet 30 and a gas outlet 32, wherein the arrangement 10 is accommodated in the body 26. More particularly, the body 26 comprises a wall defining an inner surface 28 which is formed to be in fluid communication with the arrangement 10. The body 26 and the arrangement 10 form a respective cavity 38 between each protrusion 34 and the inner surface 28 of the wall, wherein a cross-section of a respective cavity 38 in an axial and radial direction of the housing 14 is larger than a cross-section of the channel 18.

The arrangement 10 is accommodated within the body 26 such that the second end 22 of the channel 18 is in fluid communication with the gas outlet 32 and the first end 20 of the channel 18 is in fluid communication with the gas inlet 30 via the cavities 36 formed by the protrusions 34 and the outer surface 16 and the cavities 38 formed by the inner surface 26 and the protrusions 34. In such configuration a larger heat conducting surface may be provided for the combustible fluid without impairing or restricting the flow towards the valve 24. In order to avoid that the combustible fluid leaks out of the pre-chamber 12, e.g. when the pre-chamber comprises an open end not closed by the arrangement 10 (a top end in FIG. 1), a sealing 40 is provided, e.g. a sealing ring, which is arranged between the gas inlet 30 and the protrusion 34 being in closest proximity to the gas inlet 30.

Figure 2:
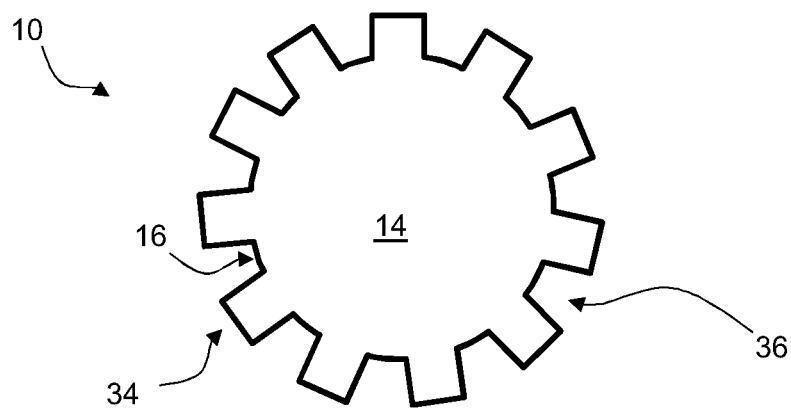
FIG. 2 shows a schematic depiction of an arrangement according to an embodiment in a top sectional view.

In FIG. 2 a schematic depiction of an arrangement 10 according to an embodiment is shown in a top sectional view. According to this exemplary embodiment the housing 14 and the plurality of protrusions 34 are integrally formed, i.e. made of a single piece. The protrusions 34 extend radially and along a circumference of the housing 14, i.e. along the outer surface 16. Although not shown in the sectional view, it will be understood that the protrusions 34 may also extend along the axial or longitudinal direction of the housing 14 so as to form corrugated ribs or fins. Such ribs or fins may furthermore be spaced apart from each other in the axial direction and may hence be formed by a plurality of protrusions 34, wherein the ribs or fins may furthermore be staggered to each other between rows of protrusions 34 in the axial direction. The protrusions 34 are evenly spaced apart from each other and define respective cavities 36 between adjacent protrusions and the outer surface 16 of the housing 14. The spacing and dimensioning as well as the number of protrusions 34 are exemplary.

Figure 3:
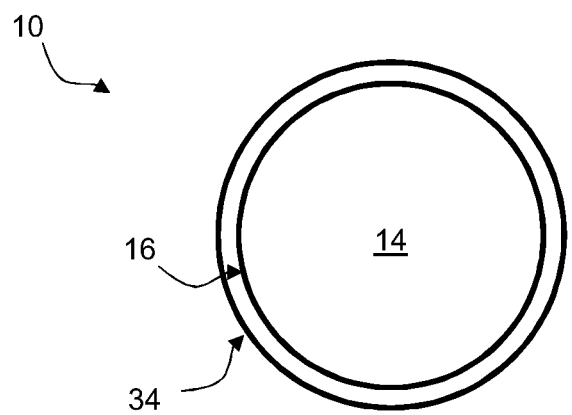
FIG. 3 shows a schematic depiction of an arrangement according to another embodiment in a top sectional view.

FIG. 3 shows an alternative embodiment of the arrangement 10 in a corresponding schematic depiction in a top sectional view. In this embodiment, the protrusion 34 is formed as an essentially homogeneous ring shape extending at least radially from the outer surface 16 of the housing 14. The radial extension of the protrusion 34 may be chosen so as to be adapted to the predefined flow of the combustible fluid and/or required heat profile. Multiple protrusions 34 may be arranged at a predefined (equal) longitudinal or axial spacing, such that multiple rings may be provided along the outer surface 16 of the housing 14.

Figure 4:
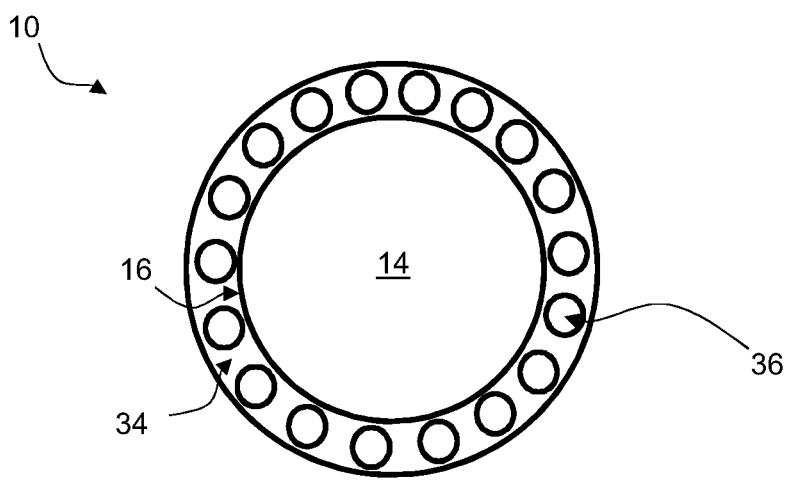
FIG. 4 shows a schematic depiction of an arrangement according to another embodiment in a top sectional view.

FIG. 4 shows a further alternative embodiment of the arrangement 10, which corresponds to the embodiment according to FIG. 3, yet has a larger radial extension for each ring-shaped protrusion 34. Furthermore, to facilitate the flow of the combustible fluid along the outer surface 16 and via the protrusion(s) 34, the protrusion 34 comprises a plurality of cavities 36, which are delimited by adjacent sections or portions of the protrusion 34. In such arrangement 10 a fluid pathway for the combustible fluid is hence provided (also) through the respective protrusion 34 via the plurality of cavities. The number and dimensioning of cavities 36 may accordingly be adapted to the predefined flow of the combustible fluid and/or required heat profile.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

An arrangement for a pre-chamber gas valve of a combustion engine, preferably a gas engine, is provided.

Such arrangement comprises a housing having an outer surface and comprising a channel, wherein a first end of the channel is in fluid communication with the outer surface and a second end of the channel is connectable to a valve seat of the pre-chamber gas valve. The arrangement furthermore comprises at least one protrusion extending from the outer surface of the housing. The first end of the channel is arranged upstream of the second end of the channel and downstream of at least one protrusion, wherein the arrangement is configured to absorb heat from a combustion portion of the combustion engine arranged downstream of the second end and to temper a gas upstream of the second end only using said heat, when the arrangement is in a mounted state.

By providing the at least one protrusion upstream of the first end of the channel, e.g. an inlet defining opening, it is ensured that a gas or combustible fluid flows along or through the at least one protrusion prior to entering the channel and prior to being provided to a downstream combustion area of a combustion engine. In other words, the protrusion forms a contacting surface for the combustible fluid, thereby providing a heat conducting element to temper the passing combustible fluid prior to entering the combustion area.

The combustible fluid is hence not only provided along the outer surface of the housing, i.e. upstream of the first end of the channel, to enable to exchange heat with the outer surface of the housing. The heat conducting surface that is brought into contact with the combustible fluid is furthermore increased by means of the at least one protrusion at the outer surface of the housing.

In the mounted state, i.e. when the arrangement is mounted or fitted within a pre-chamber of the combustion engine or the arrangement is mounted to the combustion engine, heat may dissipate into the housing via the downstream end portion of the arrangement, e.g. via the corresponding portion of the housing, the second end of the channel, and/or the valve seat of the pre-chamber gas valve.

Accordingly, heat may be absorbed and dissipated towards an upstream end of the arrangement via the housing of the arrangement. The housing may be dimensioned according to the nominal operating parameters and the corresponding heat generation so as to absorb and conduct a predefined amount of heat and/or to provide a heat profile of the arrangement adapted to temper or condition a predefined flow of a combustible fluid. Thereby, temperature fluctuations of the combustible fluid, e.g. a gas, may be significantly reduced, such that the consistency of the mass of combustible fluid provided by the valve may be increased, optimizing the performance of the combustion engine.

The arrangement, e.g. the housing, the channel, and/or the at least one protrusion, is furthermore configured to provide the conditioning of the combustible fluid only by means of the absorbed heat from the downstream combustion portion or area. In other words, the dimensioning and/or material properties of the arrangement are preferably chosen, such that a predefined heat profile of the arrangement is provided, which is adapted to a predefined flow of a combustible fluid provided by the pre-chamber valve, e.g. a pre-chamber gas valve, and which is furthermore adapted to nominal operating conditions of the combustion engine and the corresponding heat produced in the downstream combustion portion.

Thereby, heat may be dissipated by means of solid and filled materials of both the arrangement and the surrounding components of the combustion engine in the mounted state of the arrangement and the pre-chamber (valve) and combustible fluid flowing therethrough are not adapted to be conditioned or tempered by a coolant, which is provided in common solutions via a corresponding coolant cavity at a downstream portion of common pre-chambers. Accordingly, the complexity of the combustion engine as a whole and the number of variables influencing the temperature of the combustible fluid and hence the mass flow may be reduced while at the same time a more robust pre-chamber (valve) may be provided, which is furthermore easy to be replaced and/or facilitates servicing and maintenance.

The channel may be essentially positioned at a downstream portion of the arrangement, e.g. at a portion adjacent to the valve seat. The housing may define or essentially correspond to a longitudinal axis of the pre-chamber valve, wherein an extension of the channel is preferably larger in the radial direction compared with the longitudinal direction. Thereby, a path of the combustible fluid along the outer surface of the housing may be extended. Preferably, the outer surface is essentially homogeneous in a circumferential, longitudinal, and/or radial direction of the housing.

Preferably, the housing and/or the at least one protrusion are formed as a solid body, preferably made of a ceramic and/or metal. Thereby, heat dissipation and absorption may be improved and temperature fluctuations of the arrangement may be reduced, such that e.g. a predefined heat profile of the arrangement may be better maintained. Accordingly, more constant boundary conditions may be provided for the conditioning of the combustible fluid.

The arrangement may be formed as a separate component that may be mechanically and fluidically coupled to a corresponding component of a pre-chamber (valve), e.g. within a corresponding cavity adapted to accommodate the housing and the at least one protrusion. The housing and the protrusion may also be formed as separate or individual components, wherein the protrusion may e.g. be attached to the outer surface of the housing, e.g. using a frictional fitting or positive fitting. Preferably, the at least one protrusion is integrally formed with the housing or is formed from a single piece with the housing. Thereby, the arrangement may form a single replacement part and the components are directly adapted to each other, both avoiding a relative movement between the components and improving the heat dissipation or heat transfer.

The at least one protrusion may have a variety of shapes and dimensions. Preferably, the at least one protrusion extends in an axial direction of the housing, in a radially outward direction of the housing, and/or along a circumferential direction of the housing. Accordingly, one or more protrusions may extend e.g. essentially in a radial direction, i.e. perpendicular to a longitudinal direction of the housing, or both in a radial direction and in the longitudinal direction of the housing, such that the one or more protrusions may form a flaring arrangement or a corrugated arrangement, defining fins and/or ribs. An extension at least in part in a circumferential direction may furthermore facilitate that the combustible fluid is deflected, e.g. in a radial and/or circumferential direction. The one or more protrusions are thereby not restricted to an extension within a single plane, but may also form a helical or spiral shape in at least a portion of the respective portion.

The one or more protrusions hence provide a deflection of the combustible fluid flowing in a direction from a portion upstream of the protrusion(s) to the channel, downstream of the protrusion(s). Thereby, a laminar flow may be impaired and turbulences may be effected, thereby increasing the time the combustible fluid resides along the outer surface of the housing and the one or more protrusions. By increasing the residing time of the combustible fluid, heat transfer may be improved between the arrangement and the combustible fluid, such that the conditioning or tempering of the combustible fluid may be facilitated. Increasing the number of protrusions and/or the extension of the one or more protrusions may further increase the contacting time by providing further deflections and increasing the flow path of the combustible fluid.

Preferably, the at least one protrusion defines a respective cavity or pocket between the at least one protrusion and the outer surface of the housing. Such cavity ensures that a fluid path towards the first end of the channel may be provided while at the same time a heat transfer may be improved by establishing further turbulences.

Although a single protrusion may already establish a sufficient heat conducting surface, e.g. by an appropriate thickness in the longitudinal direction of the housing and a corresponding shape and extension, e.g. a helical extension essentially spanning the longitudinal length of and extending along the outer surface of the housing towards the first end of the channel while furthermore extending radially, the arrangement preferably comprises at least two adjacent protrusions defining a respective cavity or pocket between said adjacent protrusions and the outer surface of the housing. Thereby, the protrusions may together form a fluidic pathway for the combustible fluid and the combustible fluid may hence be deflected in a predetermined manner.

The number of protrusions and corresponding potential pathways may be adapted to a predefined volume flow, such that the number of protrusions and cavities may provide a heat conduction and tempering according to a predefined heat profile adapted for such volume flow.

The adjacent protrusions may be spaced apart in a circumferential direction and/or axial direction of the housing. For example, the protrusions may e.g. form corrugated ribs or fins in an axial (and radial) direction that have a predefined spacing in a circumferential direction or may e.g. form ribs or fins in a staggered arrangement, both in the axial and circumferential direction.

The arrangement preferably comprises a plurality of protrusions. For example, a first set of protrusions may be spaced apart in a longitudinal direction from at least a second set of protrusions, wherein adjacent protrusions are spaced apart in a circumferential direction, wherein the first set and second set are preferably arranged in a staggered formation relative to each other.

The adjacent protrusions may be spaced apart in an axial direction of the housing, wherein the adjacent protrusions are separated from each other or connected to each other, preferably via an extension of the adjacent protrusions. For example, the protrusions may be formed as an essentially continuous shape in the circumferential direction, e.g. a ring shape, which may be integrated in, form fitted, e.g. snap-fit, or friction fitted onto the outer surface of the housing, and wherein several continuous shapes are arranged on the outer surface with a respective longitudinal spacing between each shape. The respective protrusions may then have a larger radial, axial and/or circumferential extension than the extensions connecting the adjacent protrusions. By the same token, such shapes may also be connected to each other in the longitudinal direction to form a single structure that is coupled to or integrated with the outer surface of the housing.

Preferably, the protrusions are dimensioned such that a cross-section of a respective cavity in an axial and/or radial direction of the housing is larger than a cross-section of the channel. The cross-section is to be understood as a cross-sectional area of a flow path from an upstream to a downstream end. By ensuring that the cross-section of a respective cavity is larger than the cross-section of the channel, e.g. an inner diameter, potential pressure build-ups may be avoided and a volume flow of a combustible fluid may be guided and/or deflected so as to improve the heat transfer yet without forming any potential flow restrictions.

Furthermore, a pre-chamber for a combustion engine is suggested, comprising an arrangement as described in the above and a body having a wall defining an inner surface and accommodating the arrangement within said wall, wherein the wall comprises a gas inlet and a gas outlet, the gas inlet being arranged upstream of the at least one protrusion and the gas outlet being fluidly connectable to the second end of the channel via a pre-chamber gas valve.

The body may be mountable to the combustion engine, e.g. via a thread of the body to provide a screwing engagement, and may be formed of a solid (metal) material. The body is preferably configured to form an essentially continuous interface with a corresponding surface of one or more components of the combustion engine, when in the mounted state, such that heat transfer is established directly between the respective component and the body. Thereby, a specific cavity accommodating a coolant may not be required. Instead, the dimensioning of the body and the arrangement may be adapted to the heat generated by the downstream combustion area or portion, e.g. during normal or nominal operation, and the heat transfer provided via the body towards the one or more adjacent components of the combustion engine. Accordingly, a heat profile may be provided at least for the arrangement that is required to temper a predefined volume flow of a combustible fluid in order to provide an optimized conditioning of the temperature of the combustible fluid. Preferably, said heat profile is adapted to a corresponding heat profile of the inner surface of the wall of the body.

The body and the arrangement may form a respective cavity between the at least one protrusion and the inner surface of the wall, wherein a cross-section of a respective cavity in an axial and/or radial direction of the housing is larger than a cross-section of the channel. As described above, such dimensioning may be advantageous to optimize flow conditions while at the same time providing an efficient tempering or conditioning of the temperature of the combustible fluid. The respective cavities may be similar in cross-section to cavities defined between adjacent protrusions and/or between a respective protrusion and the outer surface of the housing. However, the cavity may also be smaller, such that the combustible fluid is biased towards a flow path defined by the respective cavities formed by the arrangement itself. Thereby, a further improvement of heat transfer between the respective protrusions and the combustible fluid may be achieved while potential pressure build-ups are avoided.

Alternatively, the at least one protrusion may be adjacent to and/or in contact with the inner surface of the wall. This may facilitate the mounting of the arrangement in the pre-chamber and furthermore provides for a further heat dissipation from the one or more protrusions to the body. Such configuration may be advantageous e.g. in case of high(er) temperatures within the combustion area, wherein heat dissipation towards the body may be advantageous in order to avoid overheating and potential structural damages.

The at least one protrusion is preferably arranged and/or shaped to provide a fluid communication between the gas inlet and the first end of the channel. Accordingly, the at least one protrusion does not block the flow of the combustible fluid, but is arranged and/or configured to divert or deflect the combustible fluid in order to increase the time the combustible fluid resides within the pre-chamber. Thereby, an improved conditioning of the temperature of the combustible fluid may be achieved. For example, the at least one protrusion may comprise a respective through hole for the combustible fluid or is shaped so as to deflect the combustible fluid towards the first end of the channel, e.g. by forming a flow path formed by a plurality of cavities defined by adjacent protrusions.

Preferably, the gas inlet and gas outlet are respectively arranged at perpendicular or opposing wall sections. In such manner, the flow path of a combustible fluid may be further increased, which is advantageous for improving the heat transfer to the combustible fluid, yet without causing undesirable pressure build-ups.

Furthermore, a combustion engine is suggested, preferably a gas engine, comprising a pre-chamber as described in the above.

INDUSTRIAL APPLICABILITY

With reference to the Figures, an arrangement for a pre-chamber gas valve of a combustion engine as well as a corresponding pre-chamber and a combustion engine equipped with such pre-chamber are suggested. The suggested arrangement as mentioned above is applicable in a variety of engines, such as gas engines, which require a controlled volume flow and mass flow, wherein the temperature of the combustible fluid may need to be controlled. Further, the arrangement may be mounted into existing pre-chambers or the pre-chamber as a whole may be replaced with a pre-chamber configured for the arrangement as a replacement or retrofit part, which may be exchanged e.g. upon or prior to overhaul or prior to use.

The invention claimed is:

1. An arrangement for a pre-chamber gas valve of a combustion engine, comprising:
    a housing having an outer surface and a channel, a first end of the channel being in fluid communication with the outer surface and a second end of the channel being connectable to a valve seat of the pre-chamber gas valve, and
    a plurality of protrusions extending from the outer surface of the housing, the plurality of protrusions being separated from one another and extending in an axial direction along the outer surface, the first end of the channel being arranged upstream of the second end of the channel and downstream of at least one protrusion, the arrangement being configured to absorb heat from a combustion portion of the combustion engine arranged downstream of the second end and to temper a gas upstream of the second end only using said heat, when the arrangement is in a mounted state.

2. The arrangement according to claim 1, wherein the housing and/or the plurality of protrusions are formed as a solid bodies preferably made of a ceramic and/or metal.

3. The arrangement according to claim 1, wherein the plurality of protrusions is integrally formed with the housing or is formed from a single piece with the housing.

4. The arrangement according to claim 1, wherein the plurality of protrusions defines a respective cavities or pockets between the plurality of protrusions and the outer surface of the housing.

5. The arrangement according to claim 1, wherein at least two adjacent protrusions define a respective cavity or pocket between said adjacent protrusions and the outer surface of the housing.

6. The arrangement according to claim 4, wherein the protrusions are dimensioned such that a cross-section of a respective cavity in an axial and/or radial direction of the housing is larger than a cross-section of the channel.

7. A pre-chamber for a combustion engine, comprising:
    an arrangement according to claim 1, and
    a body having a wall defining an inner surface and accommodating the arrangement within said wall, wherein the wall comprises a gas inlet and a gas outlet, the gas inlet being arranged upstream of the plurality of protrusions and the gas outlet being fluidly connectable to the second end of the channel via a pre-chamber gas valve.

8. The pre-chamber according to claim 7, wherein the body and the arrangement form a respective cavity between the plurality of protrusions and the inner surface of the wall, a cross-section of a respective cavity in an axial and/or radial direction of the housing being larger than a cross-section of the channel.

9. The pre-chamber according to claim 7, wherein the plurality of protrusions is adjacent to and/or in contact with the inner surface of the wall.

10. The pre-chamber according to claim 7, wherein the a plurality of protrusions is arranged and/or shaped to provide a fluid communication between the gas inlet and the first end of the channel.

11. The pre-chamber according to claim 7, wherein the gas inlet and gas outlet are respectively arranged at perpendicular or opposing wall sections.

12. A combustion engine, comprising a pre-chamber according to claim 7.

13. An arrangement for a pre-chamber gas valve of a combustion engine, comprising:
    a housing having an outer surface and a channel, a first end of the channel being in fluid communication with the outer surface and a second end of the channel being connectable to a valve seat of the pre-chamber gas valve, and
    a plurality of protrusions extending from the outer surface of the housing, the plurality of protrusions being separated from one another and extending in a circumferential direction around the outer surface, the first end of the channel being arranged upstream of the second end of the channel and downstream of at least one protrusion, the arrangement being configured to absorb heat from a combustion portion of the combustion engine arranged downstream of the second end and to temper a gas upstream of the second end only using said heat, when the arrangement is in a mounted state.

14. The arrangement of claim 13, wherein the plurality of protrusions are seperated by a plurality of cavities.

15. The arrangement of claim 14, wherein a cross-section of each of the plurality of cavities is greater than a cross-section of the channel.

16. The arrangement of claim 14, further including a body having a wall defining an inner surface and accommodating the arrangement within said wall, wherein the wall comprises a gas inlet and a gas outlet, the gas inlet being arranged upstream of the plurality of protrusions and the gas outlet being fluidly connectable to the second end of the channel via a pre-chamber gas valve.

17. The arrangement of claim 13, wherein the plurality of protrusions is integrally formed with the housing or is formed from a single piece with the housing.

18. An arrangement for a pre-chamber gas valve of a combustion engine, comprising:
    a housing having an outer surface and a channel, a first end of the channel being in fluid communication with the outer surface and a second end of the channel being connectable to a valve seat of the pre-chamber gas valve, and
    a plurality of protrusions extending from the outer surface of the housing, the plurality of protrusions being separated from one another by a plurality of cavities, the first end of the channel being arranged upstream of the second end of the channel and downstream of at least one protrusion, the arrangement being configured to absorb heat from a combustion portion of the combustion engine arranged downstream of the second end and to temper a gas upstream of the second end only using said heat, when the arrangement is in a mounted state, a cross-section of each of the plurality of cavities being greater than a cross-section of the channel.

19. The arrangement of claim 16, wherein plurality of protrusions extend along an entire axial length of the housing.

20. The arrangement of claim 16, wherein a body having a wall defining an inner surface and accommodating the arrangement within said wall, wherein the wall comprises a gas inlet and a gas outlet, the gas inlet being arranged upstream of the plurality of protrusions and the gas outlet being fluidly connectable to the second end of the channel via a pre-chamber gas valve.

* * * * *